(12) United States Patent
Dave et al.

(10) Patent No.: US 10,458,202 B2
(45) Date of Patent: Oct. 29, 2019

(54) ELECTRO-HYDRAULIC SYSTEM WITH A SINGLE CONTROL LINE

(71) Applicant: Halliburton Energy Services, Inc., Houston, TX (US)

(72) Inventors: Jalpan Piyush Dave, Singapore (SG); Paul G. James, Spring, TX (US); Pranay Asthana, Spring, TX (US); Aswin Balasubramanian, Spring, TX (US); Quanling Zheng, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 136 days.

(21) Appl. No.: 15/560,144

(22) PCT Filed: Oct. 6, 2016

(86) PCT No.: PCT/US2016/055689
§ 371 (c)(1),
(2) Date: Sep. 20, 2017

(87) PCT Pub. No.: WO2018/067153
PCT Pub. Date: Apr. 12, 2018

(65) Prior Publication Data
US 2018/0305999 A1    Oct. 25, 2018

(51) Int. Cl.
*E21B 23/04*  (2006.01)
*E21B 34/06*  (2006.01)
(Continued)

(52) U.S. Cl.
CPC ............ *E21B 34/066* (2013.01); *E21B 23/04* (2013.01); *E21B 47/06* (2013.01); *E21B 47/12* (2013.01); *F15B 13/044* (2013.01)

(58) Field of Classification Search
CPC ...... E21B 23/04; E21B 34/066; E21B 41/085; E21B 47/06; E21B 47/12; F15B 13/044; F16K 31/004
See application file for complete search history.

(56) References Cited

U.S. PATENT DOCUMENTS 3,381,753 A    5/1968  Fredd
6,109,357 A    8/2000  Zimmerman
(Continued)

FOREIGN PATENT DOCUMENTS

CA    2529915    6/2006
WO    9610123    4/1996
WO    2011011169    1/2011

OTHER PUBLICATIONS

International Search Report and Written Opinion of PCT Application No. PCT/US2016/055689, dated Jun. 15, 2017: pp. 1-16.

*Primary Examiner* — Daniel P Stephenson
(74) *Attorney, Agent, or Firm* — Chamberlain Hrdlicka (57) ABSTRACT

A system for control using a hydraulic fluid includes a hydraulic control line for flowing the hydraulic fluid, a fluid line in fluid communication with the hydraulic control line, a flow controller configured to regulate a flow of the hydraulic fluid in the fluid line, and a piezoelectric device in fluid communication with the hydraulic control line and configured to actuate the flow controller upon receiving a selected flow of the hydraulic fluid.

20 Claims, 4 Drawing Sheets

(51) Int. Cl.
*E21B 47/06* (2012.01)
*E21B 47/12* (2012.01)
*F15B 13/044* (2006.01)

(56) References Cited

U.S. PATENT DOCUMENTS

| | | | |
|---|---|---|---|
| 6,237,683 B1 | 5/2001 | Pringle et al. | |
| 6,247,536 B1 | 6/2001 | Leismer et al. | |
| 6,302,216 B1 | 10/2001 | Patel | |
| 6,349,766 B1 | 2/2002 | Bussear et al. | |
| 6,502,640 B2* | 1/2003 | Rayssiguier | E21B 23/006 |
| | | | 166/321 |
| 6,523,613 B2 | 2/2003 | Rayssiguier et al. | |
| 6,543,544 B2* | 4/2003 | Schultz | E21B 34/10 |
| | | | 166/332.1 |
| 6,575,237 B2 | 6/2003 | Purkis et al. | |
| 7,216,713 B2 | 5/2007 | Read, Jr. | |
| 7,331,398 B2 | 2/2008 | Dwivedi et al. | |
| 7,337,850 B2* | 3/2008 | Contant | E21B 23/04 |
| | | | 166/375 |
| 7,464,761 B2* | 12/2008 | Hosatte | E21B 34/06 |
| | | | 166/313 |
| 7,503,385 B2 | 3/2009 | Tips et al. | |
| 7,748,461 B2 | 7/2010 | Loretz et al. | |
| 8,074,721 B2 | 12/2011 | Guven et al. | |
| 8,096,351 B2 | 1/2012 | Peterson et al. | |
| 8,188,881 B2 | 5/2012 | Mandrou et al. | |
| 8,220,533 B2* | 7/2012 | Longfield | E21B 23/00 |
| | | | 166/66.6 |
| 8,544,542 B2 | 10/2013 | Buyers et al. | |
| 8,596,359 B2 | 12/2013 | Grigsby et al. | |
| 8,602,111 B2 | 12/2013 | Vachon | |
| 8,857,785 B2 | 10/2014 | Bussear | |
| 2003/0034899 A1 | 2/2003 | Zisk, Jr. | |
| 2006/0124310 A1 | 6/2006 | Lopez de Cardenas et al. | |
| 2007/0056745 A1 | 3/2007 | Contant | |
| 2007/0163774 A1 | 7/2007 | Hosatte et al. | |
| 2009/0084542 A1 | 4/2009 | Iain | |
| 2012/0061095 A1 | 3/2012 | Capderou | |
| 2015/0107848 A1 | 4/2015 | Leitch | |
| 2018/0305999 A1* | 10/2018 | Dave | E21B 23/04 |

\* cited by examiner

ELECTRO-HYDRAULIC SYSTEM WITH A SINGLE CONTROL LINE

This section is intended to provide relevant contextual information to facilitate a better understanding of the various aspects of the described embodiments. Accordingly, it should be understood that these statements are to be read in this light and not as admissions of prior art.

Well completion involves preparing a hydrocarbon well for commercial production. Various well completion activities include, but are not limited to, well casing and cementing, creating perforations in the casing or cement, and installing production tubing and other completion equipment, such as interval control valves and downhole gauges. A control system that includes multiple electrical and hydraulic control lines is often installed during well completion activities, for example, to control operation of the interval control valves. In the event that the electrical and hydraulic control lines are not properly deployed and installed, the control system will provide unreliable and/or inoperable service. Thus, additional equipment, such as a spooling unit to deploy the lines, can be used to aid in carrying out a successful deployment. Additionally, the electrical and hydraulic control lines may require additional protection from installation and operational damage. A number of electrical components are also needed to power the control system, well completion equipment, and other downhole components. In this case, a number of space-restricting connections and control lines to enable electrical connectivity may be needed.

BRIEF DESCRIPTION OF THE DRAWINGS

For a detailed description of the embodiments of the invention, reference will now be made to the accompanying drawings in which.

DETAILED DESCRIPTION

The present embodiments describe a single hydraulic control line to supply hydraulic fluid pressure to both generate electric power and to regulate a hydraulically actuatable device. Specifically, an electro-hydraulic downhole system uses the hydraulic fluid pressure to generate electric power, which is used to regulate the flow of the hydraulic fluid used to actuate the actuatable device.

Figure 1:
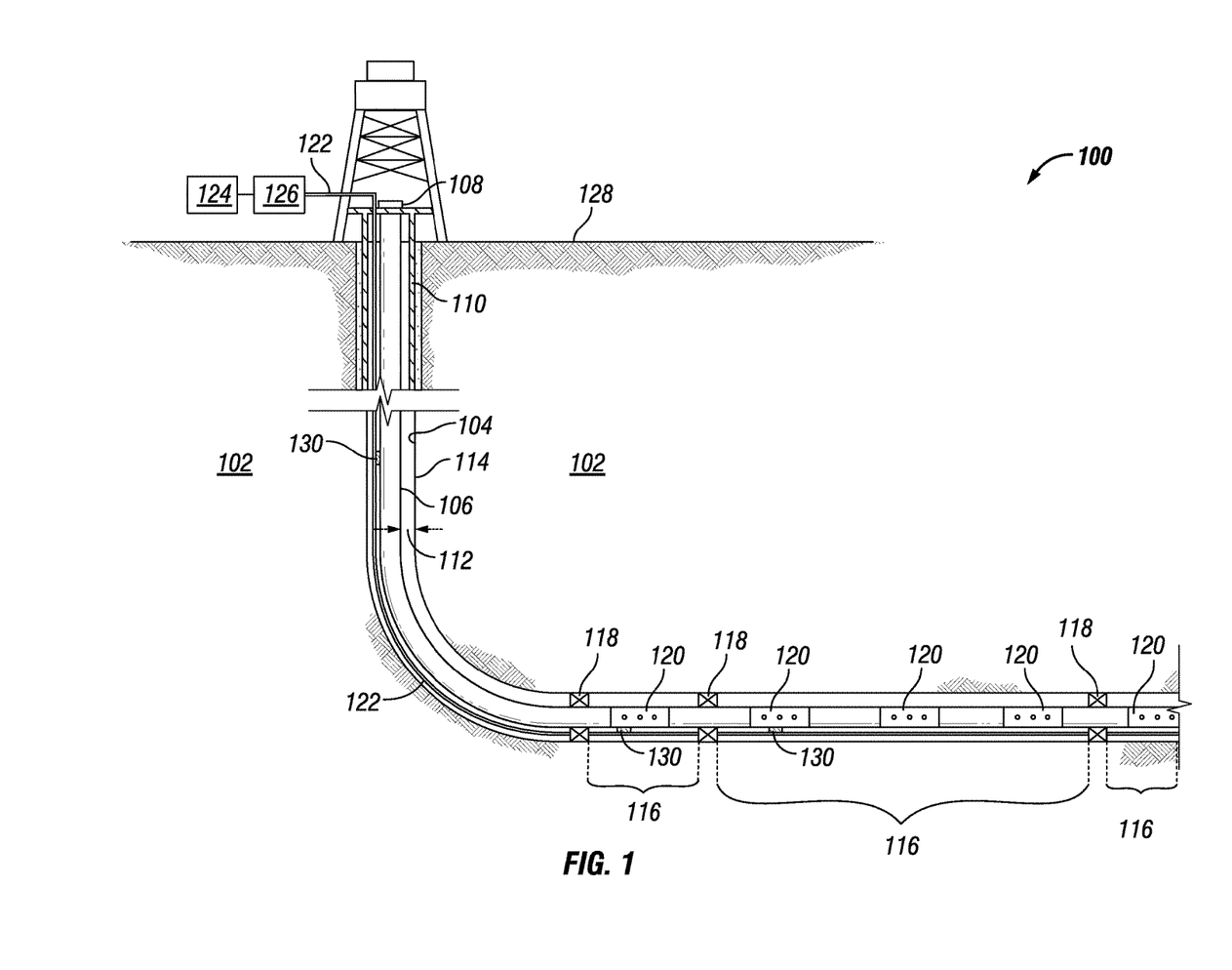
FIG. 1 is a schematic view of a well system formed within a formation, according to one or more embodiments.

FIG. 1 is a schematic view of a well system 100 formed within a formation 102, according to one or more embodiments. The well system 100 includes a wellbore 104, such as a vertical wellbore as illustrated or the wellbore 104 may include a horizontal or directional well. The wellbore 104 is formed in the formation 102 which is made of several geological layers and includes one or more hydrocarbon reservoirs. In example embodiments, a tubing string 106 extends from a wellhead 108 into the wellbore 104 to traverse the formation 102. The tubing string 106 of the embodiments can include a well completion string, a production string, a drill string, and so forth.

The wellbore 104 is cased with casing 110 to maintain the structure and prevent the wellbore 104 from collapsing inward. In some examples, a portion of the wellbore 104 is not cased and may be referred to as "open hole." An annulus area 112 is formed between the tubing string 106 and the casing 110 or a wellbore wall 114.

Fluids produced in the wellbore 104 or fluids injected into the wellbore 104 (e.g., drilling fluids, completion fluids, or treatment fluids) may flow within the tubing string 106 and the annulus area 112. For instance, a fluid produced from the wellbore 104 enters the annulus area 112 from the formation 102 to enter the tubing string 106. The tubing string 106 carries the fluid uphole to be delivered to various surface facilities for processing. In other configurations, fluid can be injected into wellbore 104 to flow through the tubing string 106, for example, for fracturing treatment or chemical treatment.

Hydraulically actuatable devices, tools and equipment can be placed in the wellbore 104 to carry out various operations, for example, to select or regulate the flow of the fluid. The actuatable devices can include sliding sleeves, flow regulators, flow control valves, packers, perforating guns, and so forth to be used in various applications including well drilling, well completion, and oil and gas production or injection, among others.

The wellbore 104 is separated into a number of zones 116 using actuatable devices, such as one or more packers 118 disposed in the annulus area 112. In particular, the packers 118 isolate portions of the wellbore 104 by providing a seal between the tubing string 106 and the wellbore 104. Each portion of the tubing string 106 disposed within one of the zones 116 can include other actuatable devices, such as control valves 120. The control valves 120 can control the flow of the fluids produced from the wellbore 104 and/or the flow of fluids injected into the tubing string 106.

Pressurized hydraulic fluids are often used to actuate the actuatable tools. In the embodiments, a single hydraulic control line 122 is provided to flow and supply a hydraulic fluid further into the wellbore 104. The hydraulic fluid can be stored in a surface storage vessel 124 and a control system 126, such as a pressure pulse system and/or a constant pressure system, is provided to selectively control the flow of the hydraulic fluid. The single hydraulic control line 122 extends from a surface 128 and into the wellbore 104 to branch out and to deliver the hydraulic fluid to one or more electro-hydraulic systems 130. As will be discussed further, the single hydraulic control line 122 of the embodiments is in fluid communication with the electro-hydraulic system 130, for example, to provide hydraulic fluid to actuate an actuatable device, such as the control valves 120 and the packers 118. In the embodiments, the electro-hydraulic systems 130 can hydraulically actuate the devices for repeated and selective actuation and de-actuation, e.g., opening and closing. Several electro-hydraulic systems 130 can be placed along the single hydraulic control line 122, for instance, at a location corresponding to a zone 116 of the wellbore 104. In any of the embodiments, the single hydraulic control line 122 can be vented into the tubing string 106, the annulus area 112, or other fluid conduit in the wellbore 104 through a valve to relieve a pressure build-up during operations.

It should be recognized that the well system 100 of FIG. 1 is merely exemplary in nature and that various additional components may be present that have not necessarily been illustrated in the interest of clarity. For example, additional components that may be present include, but are not limited to, gauges, sensors, compressors, rate controllers, and the like.

Figure 2:
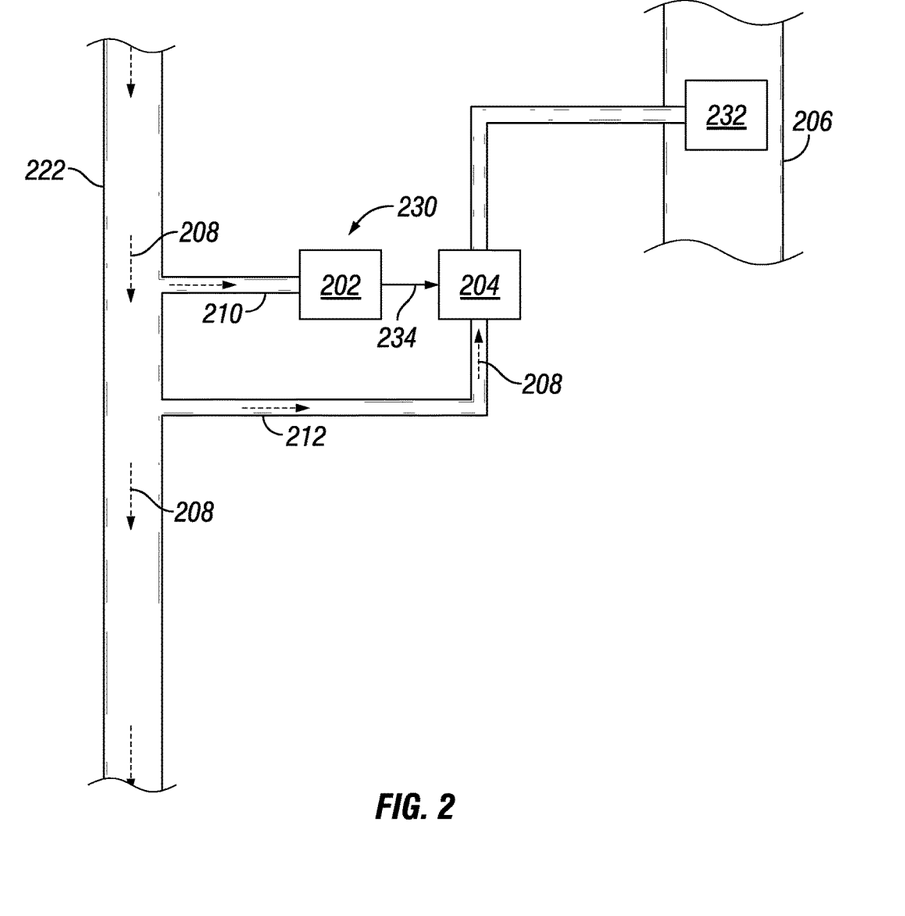
FIG. 2 is a schematic view of a single hydraulic control line in fluid communication with an electro-hydraulic downhole system, according to one or more embodiments.

FIG. 2 is a schematic view of a single hydraulic control line 222 in fluid communication with an electro-hydraulic system 230, according to one or more embodiments. A hydraulic fluid 208 flowing through the single hydraulic control line 222 supplies hydraulic fluid power to ultimately actuate an actuatable device 232. As shown, the actuatable device 232 is located within a tubing string 206 and fluidly connected to the single hydraulic control line 222 to receive the hydraulic fluid 208. In other examples, the actuatable device 232 can be located external to tubing string 206, yet, remain in fluid communication with the single hydraulic control line 222. The actuatable device 232 is actuated by a pressure or a pressure differential of the hydraulic fluid 208 in a fluid line 212 and can include valves, packers, assemblies, or any other hydraulically actuatable downhole tools and/or components of those tools.

The electro-hydraulic system 230 also includes a piezoelectric element 202 in fluid communication with the single hydraulic control line 222. The piezoelectric element 202 is communicatively coupled to a hydraulically actuated flow controller 204. The hydraulic control line 222 branches out to deliver the hydraulic fluid 208 into a fluid line 210 in communication with the piezoelectric element 202 to control the actuation of the flow controller 204. Likewise, the hydraulic fluid 208 flows into the fluid line 212 in communication with the flow controller 204, which regulates the flow of the hydraulic fluid 208 in the fluid line 212. For example, the flow controller 204 configured in a closed position can prevent the hydraulic fluid 208 from flowing further downstream to actuate the actuatable device 232. When actuation of the actuatable device 232 is desired, a selected fluid flow is transmitted to the piezoelectric element 202, triggering the piezoelectric element to transmit an electric signal to actuate the flow controller 204 to an open position, thus allowing passage of the hydraulic fluid 208 further downstream to actuate the actuatable device 232.

The piezoelectric element 202 is configured to receive a pre-determined pressure and actuates the flow controller 204 when the pressure exerted by the flowing hydraulic fluid 208 matches the pre-determined pressure. The pre-determined pressure and the pressure of the hydraulic fluid 208 may include a pressure pulse, e.g., period or amplitude, or a single, constant pressure level. For example, pressure pulses designated to actuate the actuatable device 232 to a particular configuration are transmitted through the hydraulic fluid 208 in fluid line 210 to exert a hydraulic pressure force upon the piezoelectric element 202. The piezoelectric element 202 continuously converts the hydraulic pressure force exerted by the hydraulic fluid 208 to electric power 234. However, once a match occurs between the pre-determined pressure of the piezoelectric element 202 and the pressure of the hydraulic fluid 208, the electric power 234 is then used to open the flow controller 204 to allow the hydraulic fluid 208 in the fluid line 212 to flow further downstream, for example to actuate the actuatable device 232. The electric power 234 can be stored in the case that it is not readily needed or accumulated for future use.

Accordingly, the piezoelectric element 202 controls the actuation of the actuatable device 232 by controlling the actuation of the flow controller 204. In the event that the hydraulic pressure force fails to match the pre-determined pressure of the piezoelectric element 202, the piezoelectric element 202 will not actuate the flow controller 204. For example, the piezoelectric element 202 will not open the flow controller 204 and passage of the hydraulic fluid 208 to flow into other areas of a wellbore, e.g., to actuate the actuatable device 232, is prevented.

The single hydraulic control line 222 delivers a supply of the hydraulic fluid 208 to the electro-hydraulic system 230 and to the actuatable device 232. Specifically, the single hydraulic control line 222 is configured to communicate with the piezoelectric element 202 to generate the electric power 234 to actuate the flow controller 204 to an open, or closed, position. The flow of the hydraulic fluid 208 from the single hydraulic control line 222 also passes through the flow controller 204 to be used in other activities, for example, to actuate the actuatable device 232.

Figure 3:
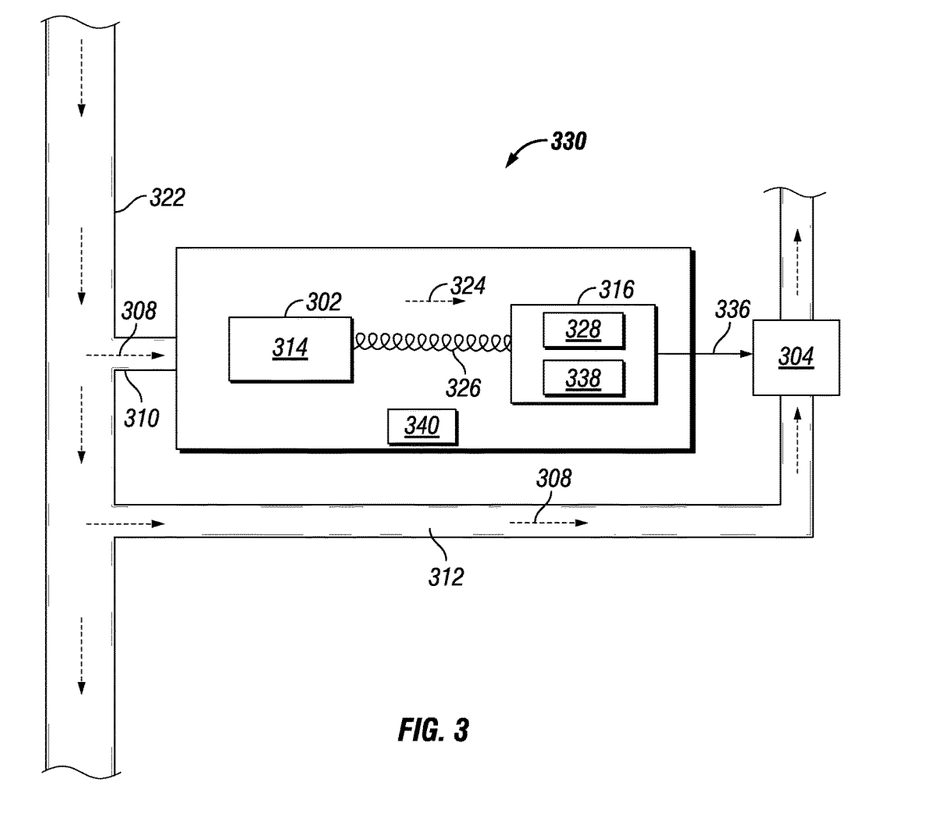
FIG. 3 is a schematic view of an electro-hydraulic downhole system, according to one or more embodiments.

FIG. 3 is a schematic view of an electro-hydraulic system 330, according to one or more embodiments. A single hydraulic fluid line 322 is in fluid communication with the electro-hydraulic system 330 that includes a piezoelectric element 302. The piezoelectric element 302 is composed of a material stack 314 that generates electric power 324 (e.g., voltage, current) when subjected to mechanical energy, such as the pressure force exerted by a hydraulic fluid 308 in a fluid line 310. The material of the piezoelectric stack 314 can include a naturally occurring material, such as quartz crystal, or an engineered material, such as lead zirconate titanate (PZT). The piezoelectric element 302 can also include a single layer of material subjected to a pressure force to generate the electric power 324.

An electrically actuating device 316 of the electro-hydraulic system 330 receives the generated electric power 324 via an electrical conductor 326, e.g. electrical wire(s), or wirelessly in a pre-programmed manner. An actuator 328 of the device 316 converts the electric power 324 into a mechanical force 336 to shift or actuate the device 316. The mechanical force 336 is transmitted from the device 316 to actuate a flow controller 304 to an open position. In other examples, the electrically actuating device 316 can include a sensor to provide a wireless signal to actuate the flow controller 304. When in the open position, the flow controller 304 allows passage of the hydraulic fluid 308 in a fluid line 312 to flow, for example, further downstream to actuate an actuatable device, a component of the actuatable device, or other actuatable systems. The electrically actuating device 316 can include a valve, a switch, or the like to regulate the flow of the hydraulic fluid 308 in the fluid line 312.

Optionally, the device 316 can include electrical circuitry 338 used in the event that the piezoelectric element 302 generates insufficient electric power 324 to actuate the flow controller 304 to an open position. The electric circuitry 338 can provide supplementary electric power that is converted into mechanical power to move the device 316 and thus, actuate the flow controller 304. Additionally, the electro-hydraulic system 330 can include optional storage 340 to store and/or accumulate the electric power 324 generated by the piezoelectric element 302 and/or the electrical circuitry 338.

Figure 4:
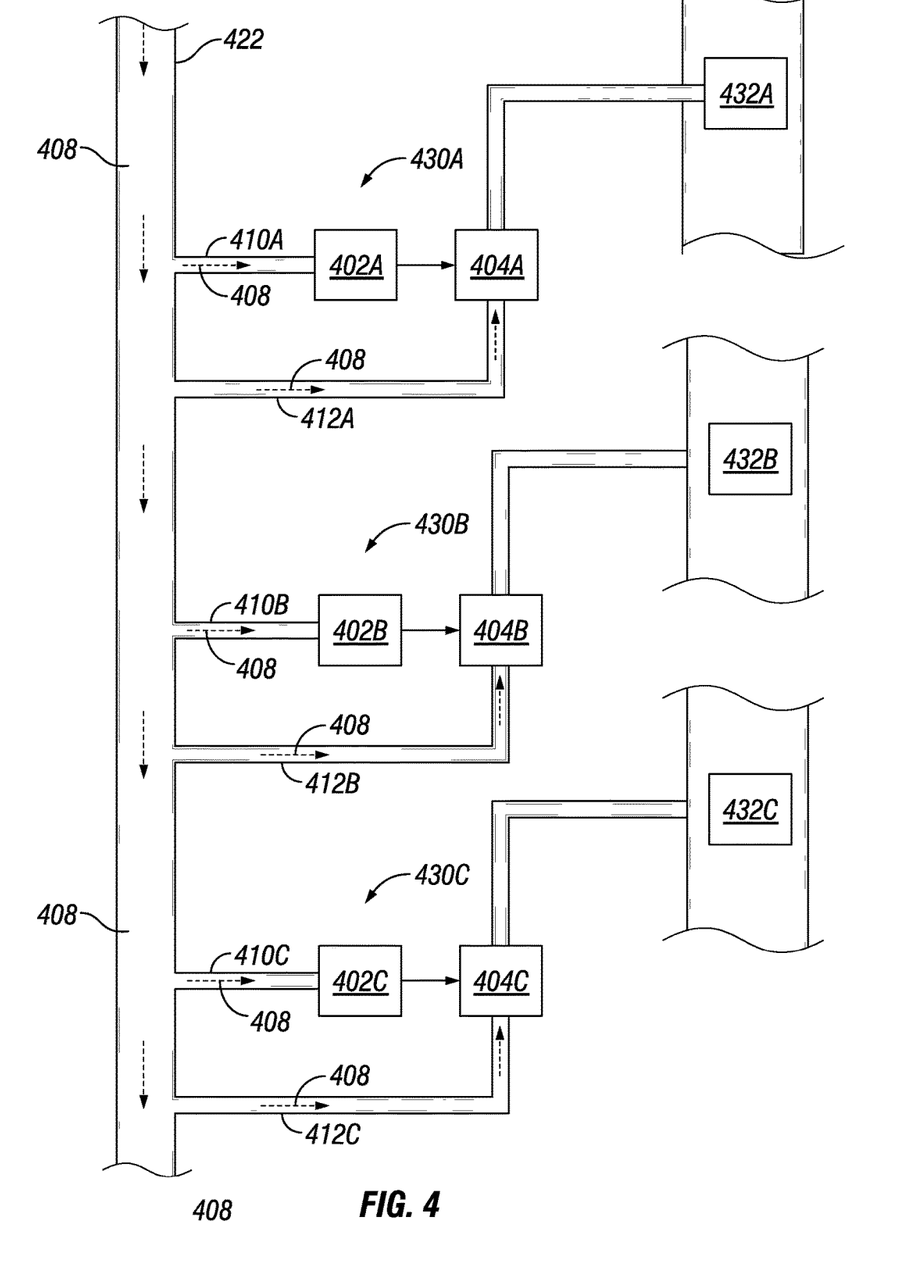
FIG. 4 is a schematic view of a single hydraulic control line in fluid communication with multiple electro-hydraulic downhole systems, according to one or more embodiments.

FIG. 4 is a schematic view of a single hydraulic control line 422 in fluid communication with multiple electro-hydraulic systems 430A, 430B, 430C, according to one or more embodiments. The single hydraulic control line 422 provides hydraulic power to each of the electro-hydraulic systems 430A, 430B, 430C to actuate an actuatable device 432A, 432B, 432C. For example, the actuatable devices of FIG. 4 include a flow control valve 432A, hydraulically set packers 432B, and a formation isolation valve 432C. Each electro-hydraulic system 430A, 430B, 430C includes a piezoelectric element 402A, 402B, 402C. A pressure(s)

transmitted through the hydraulic fluid 408 is varied in order to correspond with a specific pressure, e.g., pulse or constant pressure, related to each of the piezoelectric element 402A, 402B, 402C. For example, each piezoelectric elements 402A, 402B, 402C is set with a pre-determined pressure to actuate a corresponding actuatable device, 432A, 432B, 432C, to a particular position, respectively, when the transmitted pressure matches the pre-determined pressure of a respective piezoelectric element 402A, 402B, 402C.

Each piezoelectric element 402A, 402B, 402C is configured to correspond with an individual flow controller 404A, 404B, 404C, respectively. As illustrated in FIG. 4, the flow controller 404A is paired with the piezoelectric element 402A set with a pre-determined pressure P1 to actuate the flow control valve 432A to an open position. When the pressure applied through the hydraulic fluid 408 of fluid line 410A matches the pre-determined pressure P1, the piezoelectric element 402A responds by generating electric power that is used to actuate the flow controller 404A to an open position to allow a flow of the hydraulic fluid 408 in a fluid line 412A to pass further downstream and actuate the flow control valve 432A, for example, to an open position. In the event that the pressure of the hydraulic fluid 408 fails to match the pre-determined pressure P1, the piezoelectric element 402A will not actuate the flow controller 404A, thus, the flow control valve 432A will not open.

The piezoelectric element 402B can be set with a pre-determined pressure P2 that is different from pressure P1 to activate the packers 432B. When the applied pressure of the hydraulic fluid 408 in fluid line 410B matches the pre-determined pressure P2, the piezoelectric element 402B generates and supplies electric power to actuate the flow controller 404B to an open position. Accordingly, the hydraulic fluid 408 in fluid line 412B can flow through the flow controller 404B to hydraulically activate and set the packers 432B, for example, within a downhole environment.

The flow controller 404C is paired with the piezoelectric element 402C that is set with a pre-determined pressure P3. When the pre-determined pressure P3 matches the pressure of the hydraulic fluid 408 in fluid line 410C, the element 402C generates electric power to open the flow controller 404C. In this regard, the hydraulic fluid 408 of fluid line 412C can pass through the flow controller 404C to actuate the formation isolation valve 432C, for example, to a closed position.

In the embodiments, the single hydraulic control line 422 provides the hydraulic fluid 408 to generate electric power that controls a hydraulic fluid flow and enables a direct hydraulic communication path to actuate multiple actuatable devices 432A, 432B, 432C using hydraulic fluid power. Each individual actuatable device can be actuated individually or simultaneously with one or more other actuatable devices in one or more zones of a wellbore, if desired.

As shown, the single hydraulic control line 422 of FIG. 4 illustrates a general configuration. However, it should be understood that more complex configurations for the single hydraulic control line 422 are within the scope of this invention. For example, the single hydraulic control line 422 can communicate with additional electro-hydraulic systems to actuate various types of actuatable devices. Further, a single piezoelectric element or two individual piezoelectric element may be set with different pre-determined pressures to actuate a single actuatable tool between an open position and closed position.

In addition, to the embodiments described above, other examples of specific combinations are within the scope of the disclosure, some of which are detailed below:

Example 1

A system for control using a hydraulic fluid, comprising, a hydraulic control line for flowing the hydraulic fluid, a fluid line in fluid communication with the hydraulic control line, a flow controller configured to regulate a flow of the hydraulic fluid in the fluid line, and a piezoelectric device in fluid communication with the hydraulic control line and configured to actuate the flow controller upon receiving a selected flow of the hydraulic fluid.

Example 2

The system of Example 1, further comprising a pressure system configured to communicate a hydraulic fluid pressure to the piezoelectric device via the selected flow of the hydraulic fluid.

Example 3

The system of Example 1, wherein the selected flow of the hydraulic fluid comprises a pressure pulse signal or a constant pressure signal.

Example 4

The system of Example 1, further comprising the piezoelectric device configured to generate electric power and a storage device to store the generated electric power.

Example 5

The system of Example 1, further comprising an actuatable device in fluid communication with and actuatable by the flow of the hydraulic fluid in the fluid line.

Example 6

The system of Example 1, further comprising, multiple fluid lines in fluid communication with the hydraulic control line, multiple flow controllers, each configured to regulate a flow of the hydraulic fluid in a separate fluid line, and multiple piezoelectric devices in fluid communication with the hydraulic control line, each piezoelectric device configured to actuate a separate flow controller.

Example 7

The system of Example 6, further comprising multiple actuatable devices actuatable by the flow of the hydraulic fluid in the separate fluid lines.

Example 8

The system of Example 1, further comprising multiple flow controllers connected to a single piezoelectric device.

Example 9

The system of Example 1, further comprising multiple piezoelectric devices connected to a single flow controller.

Example 10

The system of Example 1, wherein the hydraulic control line extends downhole into a wellbore and wherein the fluid line, the flow controller, and the piezoelectric device being located in the wellbore.

Example 11

A method comprising, flowing a hydraulic fluid through a single hydraulic control line, directing a flow of the hydraulic fluid from the hydraulic control line into a fluid line, regulating the flow of the hydraulic fluid through the fluid line with a flow controller, and communicating a selected flow of the hydraulic fluid from the hydraulic control line to a piezoelectric device to actuate the flow controller.

Example 12

The method of Example 11, wherein communicating a selected flow of the hydraulic fluid further comprises sending at least one pressure signal through the hydraulic fluid flowing in the hydraulic control line.

Example 13

The method of Example 11, wherein communicating a selected flow of the hydraulic fluid further comprises matching a pressure signal transmitted through the hydraulic control line to a pre-determined pressure signal of the piezoelectric device.

Example 14

The method of Example 11, further comprising, generating electric power by converting hydraulic fluid power exerted by the selected flow of the hydraulic fluid to electric power, and storing the electric power in a storage device.

Example 15

The method of Example 11, further comprising positioning an actuatable device downhole in a wellbore and actuating the actuatable device using the flow of the hydraulic fluid in the fluid line once the flow controller is actuated.

Example 16

The method of Example 11, further comprising directing a selected flow of the hydraulic fluid to multiple piezoelectric devices, each of the piezoelectric devices configured to independently control a corresponding flow controller.

Example 17

The method of Example 11, further comprising regulating the selected flow of the hydraulic fluid with multiple flow controllers, each flow controller controlled by one or more piezoelectric devices.

Example 18

A method of controlling an actuatable device downhole in a wellbore, comprising, flowing a hydraulic fluid through a hydraulic control line extending downhole in the wellbore, directing a flow of the hydraulic fluid into a fluid line in fluid communication with the hydraulic control line, directing a flow of the hydraulic fluid to a piezoelectric device in fluid communication with the hydraulic control line, regulating the flow of the hydraulic fluid into the fluid line with a flow controller, and communicating a selected flow of the hydraulic fluid to the piezoelectric device to actuate the flow controller and allow the flow of the hydraulic fluid to actuate the actuatable device.

Example 19

The method of Example 18, wherein communicating a selected flow of the hydraulic fluid comprises matching a pressure signal transmitted through the hydraulic control line with a pre-determined pressure signal of the piezoelectric device.

Example 20

The method of Example 18, wherein communicating a selected flow of the hydraulic fluid comprises sending a pressure pulse or a constant pressure via the hydraulic fluid to excite at least two piezoelectric devices to generate electric power at each piezoelectric device.

Example 21

The method of Example 20, further comprising regulating a selected flow of the hydraulic fluid in a fluid line using a corresponding flow controller for each of the piezoelectric devices.

Example 22

The method of Example 20, further comprising attaching multiple actuatable devices to the hydraulic control line, each piezoelectric device configured to control at least one of the actuatable devices.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially"

generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A system for control using a hydraulic fluid, comprising:
    a hydraulic control line for flowing the hydraulic fluid;
    a fluid line in fluid communication with the hydraulic control line;
    a flow controller configured to regulate a flow of the hydraulic fluid in the fluid line;
    a piezoelectric device in fluid communication with the hydraulic control line and configured to generate electric power and to actuate the flow controller upon receiving a selected flow of the hydraulic fluid; and
    a storage device to store the generated electric power from the piezoelectric device.

2. The system of claim 1, further comprising a pressure system configured to communicate a hydraulic fluid pressure to the piezoelectric device via the selected flow of the hydraulic fluid.

3. The system of claim 1, wherein the selected flow of the hydraulic fluid comprises a pressure pulse signal or a constant pressure signal.

4. The system of claim 1, further comprising an actuatable device in fluid communication with and actuatable by the flow of the hydraulic fluid in the fluid line.

5. The system of claim 1, further comprising:
    multiple fluid lines in fluid communication with the hydraulic control line;
    multiple flow controllers, each configured to regulate a flow of the hydraulic fluid in a separate fluid line; and
    multiple piezoelectric devices in fluid communication with the hydraulic control line, each piezoelectric device configured to actuate a separate flow controller.

6. The system of claim 5, further comprising multiple actuatable devices actuatable by the flow of the hydraulic fluid in the separate fluid lines.

7. The system of claim 1, further comprising multiple flow controllers connected to a single piezoelectric device.

8. The system of claim 1, further comprising multiple piezoelectric devices connected to a single flow controller.

9. The system of claim 1, wherein the hydraulic control line extends downhole into a wellbore and wherein the fluid line, the flow controller, and the piezoelectric device being located in the wellbore.

10. A method comprising:
    flowing a hydraulic fluid through a single hydraulic control line;
    directing a flow of the hydraulic fluid from the hydraulic control line into a fluid line;
    regulating the flow of the hydraulic fluid through the fluid line with a flow controller;
    communicating a selected flow of the hydraulic fluid from the hydraulic control line to a piezoelectric device to actuate the flow controller;
    generating electric power by converting hydraulic fluid power exerted by the selected flow of the hydraulic fluid to electric power; and
    storing the electric power in a storage device.

11. The method of claim 10, wherein communicating a selected flow of the hydraulic fluid further comprises sending at least one pressure signal through the hydraulic fluid flowing in the hydraulic control line.

12. The method of claim 10, wherein communicating a selected flow of the hydraulic fluid further comprises matching a pressure signal transmitted through the hydraulic control line to a pre-determined pressure signal of the piezoelectric device.

13. The method of claim 10, further comprising positioning an actuatable device downhole in a wellbore and actuating the actuatable device using the flow of the hydraulic fluid in the fluid line once the flow controller is actuated.

14. The method of claim 10, further comprising directing a selected flow of the hydraulic fluid to multiple piezoelectric devices, each of the piezoelectric devices configured to independently control a corresponding flow controller.

15. The method of claim 10, further comprising regulating the selected flow of the hydraulic fluid with multiple flow controllers, each flow controller controlled by one or more piezoelectric devices.

16. A method of controlling an actuatable device downhole in a wellbore, comprising:
    flowing a hydraulic fluid through a hydraulic control line extending downhole in the wellbore;
    directing a flow of the hydraulic fluid into a fluid line in fluid communication with the hydraulic control line;
    directing a flow of the hydraulic fluid to a piezoelectric device in fluid communication with the hydraulic control line;
    regulating the flow of the hydraulic fluid into the fluid line with a flow controller;
    communicating a selected flow of the hydraulic fluid to the piezoelectric device to actuate the flow controller and allow the flow of the hydraulic fluid to actuate the actuatable device;
    generating electric power by converting hydraulic fluid power exerted by the selected flow of the hydraulic fluid to electric power; and
    storing the electric power in a storage device.

17. The method of claim 16, wherein communicating a selected flow of the hydraulic fluid comprises matching a pressure signal transmitted through the hydraulic control line with a pre-determined pressure signal of the piezoelectric device.

18. The method of claim 16, wherein communicating a selected flow of the hydraulic fluid comprises sending a pressure pulse or a constant pressure via the hydraulic fluid to excite at least two piezoelectric devices to generate electric power at each piezoelectric device.

19. The method of claim 18, further comprising regulating a selected flow of the hydraulic fluid in a fluid line using a corresponding flow controller for each of the piezoelectric devices.

20. The method of claim 18, further comprising attaching multiple actuatable devices to the hydraulic control line, each piezoelectric device configured to control at least one of the actuatable devices.

* * * * *